United States Patent
Watson et al.

(10) Patent No.: US 6,936,317 B2
(45) Date of Patent: Aug. 30, 2005

(54) INK JET PRINTING PAPER

(75) Inventors: Mark Victor Watson, Oxford (GB); Gary Paul Westwood, Chester (GB)

(73) Assignee: Arjo Wiggins Fine Papers Limited, Basingstoke (GB)

(*) Notice: Subject to any disclaimer, the term of this patent is extended or adjusted under 35 U.S.C. 154(b) by 55 days.

(21) Appl. No.: 10/168,687

(22) PCT Filed: Dec. 12, 2000

(86) PCT No.: PCT/GB00/04740
§ 371 (c)(1),
(2), (4) Date: Nov. 1, 2002

(87) PCT Pub. No.: WO01/45956
PCT Pub. Date: Jun. 28, 2001

(65) Prior Publication Data
US 2003/0124272 A1 Jul. 3, 2003

(30) Foreign Application Priority Data
Dec. 22, 1999 (GB) .............................................. 9930127

(51) Int. Cl.⁷ ................................................. B41M 5/40
(52) U.S. Cl. ............................... 428/32.37; 428/32.21; 428/32.28; 428/32.35; 428/32.38
(58) Field of Search ........................... 428/32.21, 32.28, 428/32.35, 32.37, 32.38

(56) References Cited

U.S. PATENT DOCUMENTS 4,542,059 A  9/1985 Toganoh et al.
6,414,065 B1 * 7/2002 Boylan ........................ 524/425
6,485,812 B1 * 11/2002 Sekiguchi ................ 428/32.29

FOREIGN PATENT DOCUMENTS

| | | |
|---|---|---|
| EP | 0411638 | 2/1994 |
| EP | 0582466 | 2/1994 |
| EP | 0938980 | 9/1999 |
| GB | 2316890 | 3/1998 |
| WO | WO96/29369 | 9/1999 |
| WO | WO01/34906 | 5/2001 |

OTHER PUBLICATIONS

Specialty Minerals, Inc. "Performance Minerals for Ink Jet Papers", 1998.

Grace Davison, a division of W.R. Grace & Co., "Silicas in Ink Receptive Coatings".

* cited by examiner

Primary Examiner—B. Shewareged
(74) Attorney, Agent, or Firm—Burns, Doane, Swecker & Mathis, L.L.P.

(57) ABSTRACT

Ink jet printing paper carries a pigment coating comprising (a) a major proportion of a finely divided precipitated calcium carbonate (PCC) having a surface area of at least 60 $m^2g^{-1}$, preferably 80 to 90 $m^2g^{-1}$ (b) a minor proportion of a gel-type silica and (c) binder. The silica is preferably present in an amount of 15 to 30% by weight of the total dry weight of silica and PCC. The pigment coating is preferably made up as an aqueous composition having a solids content of 25 to 35% and a Brookfield viscosity of 150 to 2000 mPa s and applied by a blade coating technique.

16 Claims, No Drawings

INK JET PRINTING PAPER

This invention relates to ink-jet printing paper, i.e. to paper which is specially adapted to give good imaging performance when used with an ink jet printer.

Ink-jet printers will produce an image on most papers, but the print quality varies markedly in dependence on the nature of the paper used. By "print quality" is meant factors such as the sharpness, intensity and uniformity of the image produced and its susceptibility to smudging immediately or shortly after the ink has been applied. In the case of colour printing, it is important also that the colours should not run into one another and that they should be vivid, with good brightness.

Print quality is influenced by a number of factors, but the two most important are the extent to which the ink droplets spread out after contact with the paper and the rapidity with which the ink droplets are absorbed into the paper. Excessive droplet spreading produces an image which appears blurred, with fuzzy edges and a general lack of resolution. Slow absorption of the ink into the paper can result in smudging of the image and in merging of ink from different droplets, giving ragged images and, if the ink droplets are of different colours, running of the colours into one another, often termed print bleed. It is also important that ink absorption should be even over the entire surface of the paper, in order to avoid a mottled effect.

In order to achieve the highest quality colour images, with vivid bright colours which do not run into one another, it is necessary to apply a pigment coating to the paper. The pigment coating makes the paper highly absorptive to the aqueous ink vehicle, so that the vehicle drains away quickly into the body of the paper, leaving the coloured dye at the surface and thereby giving bright intense colours with minimal print bleed.

A wide variety of pigments has been proposed for such coatings, but in our experience the use of gel-type silicas is necessary to give the desired print quality. However, such silicas are expensive, and because of their rheological characteristics, they can only be used at relatively low solids content. This creates a heavy drying load, and the increased absorption of water into the base paper can lead to dimensional instability and undesirable effects such as cockling, lack of sheet flatness and poor sheet aspect, i.e. the sheet has an uneven appearance.

A further problem with silica pigments is that the coating application techniques which can be used are limited. In particular, blade coating, a fast and highly cost-effective technique, is difficult or impossible to use satisfactorily with pigment coatings based primarily on silica pigments, partly for rheological reasons and partly for print quality reasons. A low coatweight blade-metered coating is found to give an unacceptable level of mottle, i.e. uneven optical density. This is thought to be because at low coatweights, there is a difference in the coating thickness applied at the "hills" and "valleys" of the underlying paper surface. The ink absorption characteristics vary as a consequence of the differences in coating thickness, and a mottled effect results. If it is sought to counteract this by increasing the coatweight, so that "hill" to "valley" variations are less significant, then a lower optical density print is obtained (this is thought to be because the coating is so absorbent that the colourants in the ink are transported too far into the body of the coating instead of staying on the surface where they are most visible and effective).

The most widely used general-purpose paper coating pigments are kaolin and calcium carbonate, particularly precipitated calcium carbonate (PCC). They have been used or proposed for use in coated ink jet papers, but primarily as extenders or in low-cost papers not designed to produce the highest quality colour images. More recently, speciality PCC products have been developed specifically for ink-jet use, see for example International Patent Application No. WO96/29369A of Minerals Technologies Inc. A speciality PCC product for ink jet use has been commercialised under the product name Jetcoat 30 by Specialty Minerals Inc., U.S.A., whose promotional literature states that Jetcoat is a trade mark of Minerals Technologies Inc., U.S.A.

The speciality PCC product just referred to is much cheaper than silica pigments, and is easier to use from a rheological standpoint. The suppliers emphasise that it can be applied under high shear conditions by, for example, air knife or blade coaters, formulations for which are recommended by the suppliers. These recommended formulations contain no other pigments. Our experience confirms that coatings based on this speciality PCC product give excellent colour prints. However, although this type of PCC undoubtedly represents a significant development in the art, we have found that still further enhanced ink jet printing performance can be obtained if, instead of using the speciality PCC on its own, as suggested in the supplier's promotional literature and in WO-A-96/29369A referred to above, a minor proportion of gel-type silica is included in the formulation. We have also found that such a formulation can be applied at economically low coatweights by blade coating without giving rise to unacceptable mottling. These discoveries underlie the present invention as defined below.

A "speciality PCC" as referred to above is a finely-divided PCC product of a surface area of at least about 60 to 65 $m^2g^{-1}$, preferably about 80 to 90 $m^2g^{-1}$. Generally the surface area will not exceed about 95 to 100 $m^2g^{-1}$. The desired surface area characteristics can be obtained by heat ageing in the presence of an organophosphonate compound as disclosed in International Patent Application No. WO96/29369A. Typically the individual PCC particles are generally spherical in shape, and have a diameter of the order of 0.02 to 0.03 μm.

According to a first aspect of the present invention, there is provided ink jet printing paper carrying a pigment coating comprising (a) a major proportion of a finely divided PCC having a surface area of at least 60 $m^2g^{-1}$ (b) a minor proportion of a gel-type silica and (c) a binder.

In a second aspect, the invention provides a blade coatable composition comprising components (a) to (c) as just referred to and having a viscosity in the range about 150 to about 2000 mPa s, preferably about 300 to about 1600 mPa s, as measured by a Brookfield (trade mark) viscometer, Model RVT, 100 r.p.m. The mix viscosity is considerably dependent on the constituents of the composition. For a high-resolution product with a relatively high silica content, the preferred viscosity range is from about 800 to about 1600 mPa s, whereas for a somewhat lower resolution product, the preferred viscosity can be below this range. The mix viscosity is of course influenced by the solids content of the composition, which is typically 25 to 35%).

In a third aspect, the invention provides a method of producing an ink jet printing paper according to the first aspect of the invention by blade coating a composition according to the second aspect of the invention on to a base paper substrate.

The surface area of the finely divided PCC used in the present invention is preferably up to 100 $m^2g^{-1}$, and more preferably is in the range 65 to 95 $m^2g^{-1}$, even more preferably 80 to 90 $m^2g^{-1}$. Desirably the finely divided PCC has been heat aged in the presence of an organophosphonate compound after its initial precipitation. The finally divided PCC is preferably composed predominantly of generally spherical particles of a diameter of 0.02 to 0.03 μm.

Preferably, the gel type silica is present in an amount of 15 to 30%, more preferably 20 to 30% of the total dry weight of silica and PCC. The optimum amount of silica present depends to some extent on the particular silica product used and the properties required in the final coated paper product. A, proportion of finely divided PCC as referred to above can be substituted by another PCC coating pigment not as specified above, or by a finely ground natural calcium carbonate pigment (GCC). The amount of this other PCC or GCC which can be used depends on the nature of the product concerned, but typically is up to about 25 to 30% of the total calcium carbonate present.

The binder used can be chosen from conventional hydrophilic paper coating binders, but is preferably a polyvinyl alcohol (PVA), for example a medium molecular weight PVA having a degree of hydrolysis of about 88%. The PVA is preferably used together with polyvinyl pyrrolidone binder (PVP), in a dry weight ratio of about 60:40 to about 80:20, preferably about 70:30.

A proportion of polydiallyldimethylammonium chloride (polyDADMAC) or other water fastness agent can also be present to impart additional water-fastness to the printed image.

The coating formulation can be varied depending on the level of image resolution required, i.e. on the type of printer with which the paper is intended to be used, for example whether it is to be suitable for a 720 or a 360 dots per inch printer (ca. 283 or 142 dots per cm). Further information on modification of the coating formulation to suit different printers is given in the specific Examples below.

Although blade coating techniques are particularly advantageous for making the present ink jet papers, other coating techniques can be used, for example Meyer bar and air-knife coating.

The base paper used in the case of blade coating and Meyer bar coating is preferably a smooth sized paper of a Bekk smoothness of about 50 to 60 seconds, but an unsized or lightly-sized paper can be used with certain formulations (ink strike-through from one side of the paper to the other can be a problem when using such paper, and so only certain formulations are usable with it). For air knife coating, the smoothness of the base paper is less important, and even deliberately textured base papers can be used.

The coatweight of pigment coating applied is preferably about 9 or 10 to 12 g m$^{-2}$, on a dry weight basis, for a high resolution product. Lower coatweights can be used for lower resolution products. The minimum effective coatweight depends to some extent on the coating method used. For blade and Meyer bar coating, it is about 7 gm$^{-2}$, and for air-knife coating about 4 gm$^{-2}$. The grammage of the base paper can vary quite widely but typically is of the order of 80 to 180 gm$^{-2}$.

The invention will now be illustrated by the following Examples and Comparative Examples (controls), in which all parts and percentages are by weight, unless otherwise stated:

EXAMPLE 1

An aqueous coating composition with the following composition (on a dry basis) was made up at a solids content of 28%:

| Component | Parts |
|---|---|
| PCC (Jetcoat* 30, product of Specialty Minerals Inc., Pennsylvania, USA) | 76.4 |
| Gel-type silica (Syloid* ED3, product of Grace Davison Division of W. R. Grace Co.) | 16.9 |
| PVA (Mowiol* 18–88, product of Clariant) | 4.7 |
| PVP (Lumiten* PPR 8450, product of BASF) | 2.0 |

Specialty Minerals Inc. state in their product information literature that Jetcoat 30 PCC has a surface area of 80 m$^2$g$^{-1}$.

The composition, which had a measured viscosity of 250 mPa s, was blade coated on to a smooth 94 gm$^{-2}$ base paper of ca. 50 seconds Bekk smoothness at a coating speed of 400 min$^{-1}$. The dry coatweight applied was ca. 13 gm$^{-2}$.

The resulting paper was then imaged by an Epson* Stylus Colour 640 ink jet printer which can print at 360, 720 or 1440 dots per inch (142, 283 or 567 dots per cm). The image quality was good in the lower resolution mode, with no observable mottle and good optical density. In the higher resolution mode, the printing performance was good so far as print density and absence of mottle was concerned, but there was an unacceptable level of print bleed.

EXAMPLE 2

The procedure of Example 1 was repeated, but with altered amounts of PCC and silica (68.3 and 25.0 parts respectively). The solids content and viscosity were 28% and 320 mPa s respectively. The resulting paper had improved ink absorbency and no print bleed was apparent, even with the higher resolution print mode. Overall print performance was better than for the paper produced in Example 1.

EXAMPLE 3

This was similar to the previous Examples, except that 70.3 parts of PCC and 23.0 parts of silica were used. The solids content and viscosity were 29% and 600 mPa s respectively.

The print performance of the resulting paper was comparable to that of Example 2.

EXAMPLE 4

This illustrates the use of a small proportion of polyDADMAC in a formulation also containing the components used in Examples 1 and 2. The amounts (parts) used were as follows:

| | |
|---|---|
| PCC | 65.6 |
| Silica | 24.0 |
| PVA | 4.5 |
| PVP | 1.9 |
| polyDADMAC (C40 LV, product of Intace, France) | 4.0 |

The solids content and viscosity were 29.5% and 1200 mPa s respectively. In repeat runs, the solids content was slightly different, but still of the order of 29 to 30%, but the viscosity varied from 500 to 1600 mPa s. The print performance of the resulting papers was comparable to that of Example 2 in most respects, but even better in terms of image sharpness and, particularly, water fastness.

EXAMPLE 5

This illustrates the use of a finely-divided standard coating grade GCC (Carbilux*, product of ECC International) as a lower cost extender for the speciality PCC. Two slightly different formulations (a) and (b) were run, as follows, in a procedure otherwise as in Examples 1, 2 and 4:

|  | (a) | (b) |
|---|---|---|
| Speciality PCC | 55.0 | 54.5 |
| GCC | 23.0 | 18.7 |
| Silica | 14.0 | 17.8 |
| PVA | 4.3 | 4.3 |
| PVP | — | 1.0 |
| PolyDADMAC | 3.7 | 3.7 |

The solids content of the mixes were 31.5% for formulation (a) and 31% for formulation (b). The viscosities were 350 and 380 mPa s respectively.

Both of the resulting papers had good print quality in the lower resolution print mode. The formulation (a) paper was comparable to the Example 1 paper, except that the print bleed was slightly worse. Formulation (b) was better in this respect, giving a performance comparable with that of Example 1, despite the presence of the cheaper PCC.

EXAMPLE 6

This illustrates the production of the present ink jet paper by Meyer bar coating.

An aqueous coating composition with the following composition (on a dry basis) was made up using the same components as in Example 4 but at a solids content of 28.6%:

| Component | Parts |
|---|---|
| PCC | 64.0 |
| Silica | 23.4 |
| PVA | 7.0 |
| PVP | 1.8 |
| PolyDADMAC | 3.8 |

The composition which had a measured viscosity of 480 mPa s, was coated by means of a laboratory Meyer bar coater on to a smooth 74.5 gm$^{-2}$ base paper of ca. 60 seconds Bekk smoothness. A No. 10 Meyer bar loaded with two 0.454 Kg (1 lb) weights was used. The dry coatweight applied was ca. 9.5 gm$^{-2}$.

The resulting paper was imaged by each of the following ink jet printers:

| Printer |  | Dots per cm (inch) |
|---|---|---|
| Epson Stylus Photo | 700 | 283 (720) |
| Epson Stylus Colour | 1520 | 283 (720) |
| Hewlett Packard Deskjet | *720C | 118 (300) |
| Hewlett Packard Deskjet | 970Cxi | )Not applicable/"Best" |
| Hewlett Packard Deskjet | 890C | )setting used |

Print quality was found to be good for all printers, with no observable mottle or ink bleed, and acceptable resolution.

EXAMPLE 7

This illustrates the production of the present ink jet paper by an air knife coating technique.

An aqueous coating composition was made up as follows (on a dry basis) using the same components as in Example 4 but at a solids content of 21%.

| Component | Parts |
|---|---|
| PCC | 62.4 |
| Silica | 23.0 |
| PVA | 9.0 |
| PVP | 1.8 |
| PolyDADMAC | 3.8 |

The composition had measured viscosity of 72 mPa s and was coated by means of a production scale air-knife coater at 70 m min$^{-1}$ onto a smooth white 100 gm$^{-2}$ base paper. The dry coatweight applied was 7.5 gm$^{-2}$.

The resulting paper was imaged with an Epson Stylus Colour 700 ink jet printer at 283 dots per cm (720 dots per inch). Both resolution and print quality were very good, with no ink bleed or mottle.

Comparative Example 1

This illustrates the effect of omitting silica from the coating composition.

The procedure of Example 6 was repeated, but with no silica and an increased amount of PCC (87.4 parts). The composition was made up at a solids content of 23.6%, with a measured viscosity of 135 mPa s.

The resulting paper showed a small degree of ink bleed and poorer resolution. The print was also duller than the prints obtained in Example 6.

Comparative Example 2

This illustrates the effect of using a standard coating grade PCC in the coating composition instead of a speciality PCC as required by the present invention.

The procedure of Example 6 was repeated, but with the speciality PCC (Jetcoat 30) being replaced with a standard coating PCC (Faxe RC-50, product of J. M. Huber Corporation U.S.A., supplied from Denmark, and having a surface area of 8.6 m$^2$g$^{-1}$). The composition was then diluted with 120 g of water, after which its solids content and measured viscosity were 38.2% and 2660 mPa s respectively.

The resulting paper showed acceptable resolution, with some bleed on the Epson stylus 1520 printer. The prints were very dull (more so than in the previous comparative Example).

In the above Examples:
1. All viscosities quoted were measured using a Brookfield Model RVT viscometer at 100 r.p.m.
2. * indicates a proprietary trade mark.

What is claimed is:

1. Ink jet printing paper carrying a pigment coating comprising (a) a major proportion of a finely divided precipitated calcium carbonate (PCC) having a surface area of at least 60 m$^2$g$^{-1}$ (b) a minor proportion of a gel-type silica in an amount of at least 15% of the total dry weight of silica and PPC, and (c) a binder.

2. Ink jet printing paper as claimed in claim 1, wherein the gel-type silica is present in an amount of 15 to 30% of the total dry weight of silica and PPC.

3. Ink jet printing paper as claimed in claim 1, wherein the finely divided PCC has a surface area of up to 100 m$^2$g$^{-1}$.

4. Ink jet printing paper as claimed in claim 1, wherein the finely divided PCC has a surface area in the range of 65 to 95 m$^2$g$^{-1}$.

5. Ink jet printing paper as claimed in claim 1, wherein the finely divided PCC has been heat aged in the presence of an organophosphonate compound after its initial precipitation.

6. Ink jet printing paper as claimed in claim 1, wherein the finely divided PCC is composed predominantly of generally spherical particles of a diameter of 0.02 to 0.03 μm.

7. Ink jet printing paper as claimed in claim 1, wherein a proportion of the finely divided PCC is substituted by another PCC coating pigment or by a finely-ground natural calcium carbonate pigment (GCC).

8. Ink jet printing paper as claimed in claim 7, wherein the other PCC or the GCC is present in an amount of up to 25 to 30% of the total calcium carbonate present.

9. Ink jet printing paper as claimed in claim 1, wherein the binder is a medium molecular weight PVA having a degree of hydrolysis of about 88%.

10. Ink Jet printing paper as claimed in claim 9, wherein the PVA is used together with polyvinyl pyrrolidone (PVP), in a dry weight ratio of 60:40 to 80:20.

11. Ink jet printing paper as claimed in claim 1, wherein the pigment coating comprises a proportion of polydiallyldimethylammonium chloride (polyDADMAC) or other water fastness agent.

12. Ink jet printing paper as claimed in claim 1, wherein the pigment coating is present on a smooth sized base paper of a Bekk smoothness of about 50 to 60 seconds.

13. Ink jet printing paper as claimed in claim 1, wherein the pigment coating is present at a coatweight in the range of about 4 to 12 $gm^{-2}$, on a dry weight basis.

14. Ink jet printing paper as claimed in claim 4, wherein the finely divided PCC has a surface area in the range of 80 to 90 $m^2 g^{-1}$.

15. Ink jet printing paper as claimed in claim 2, wherein the gel-type silica is present in an amount of 20 to 30% of the total dry weight of silica and PCC.

16. Ink jet printing paper as claimed in claim 10, wherein the PVA is used together with PVP in a dry weight ratio of 70:30.

* * * * *